Figure 1:
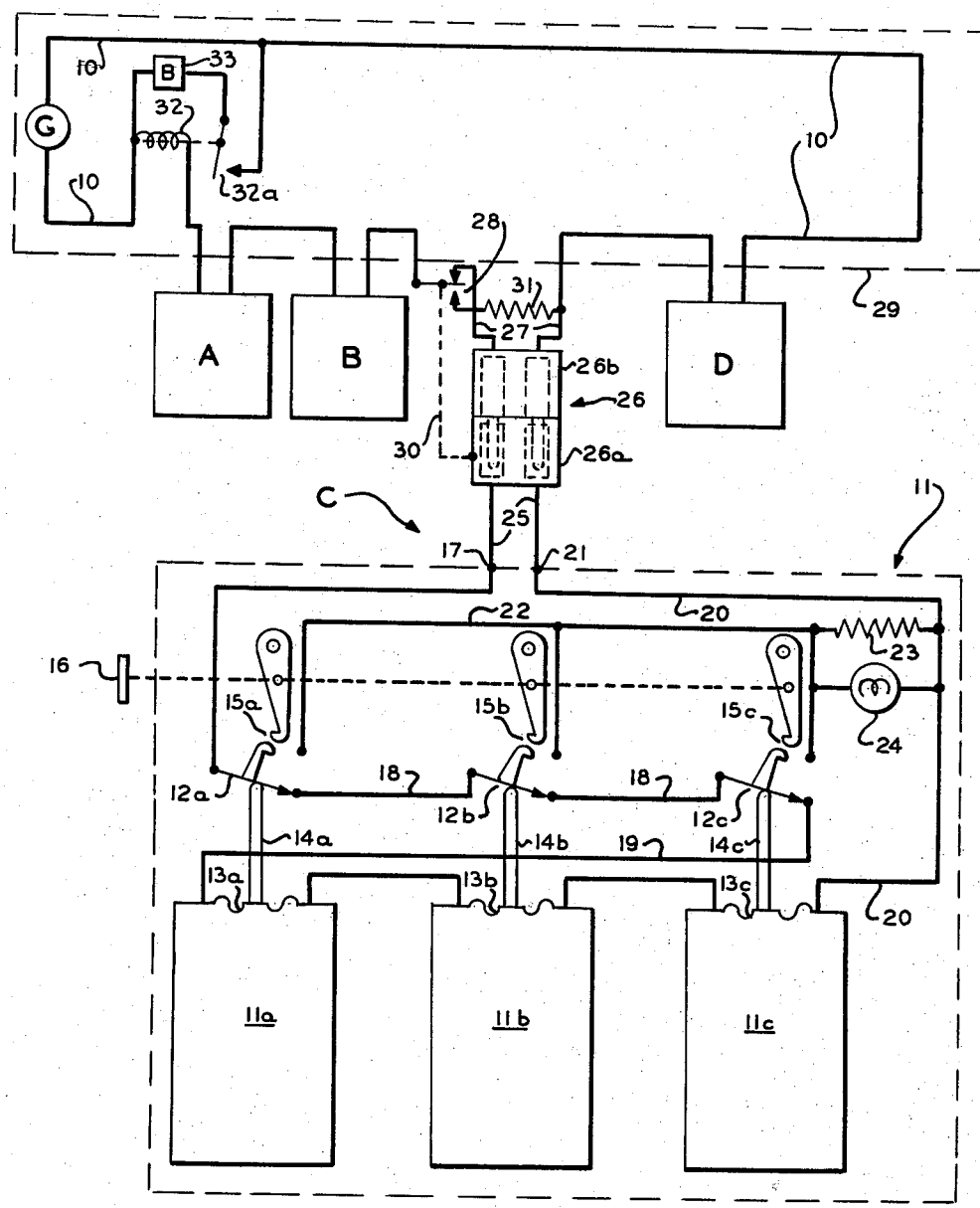

INVENTOR.
DONALD W. COLLIER
BY George H. Fritzinger
AGENT

INVENTOR.
DONALD W. COLLIER

United States Patent Office 3,100,862
Patented Aug. 13, 1963

3,100,862
SEALED STORAGE CELLS AND CHARGING CIRCUITS THEREFOR
Donald W. Collier, Pines Lake, Wayne, N.J., assignor, by mesne assignments, to The Electric Storage Battery Company, Philadelphia, Pa., a corporation of New Jersey
Filed Nov. 23, 1959, Ser. No. 854,718
6 Claims. (Cl. 320—46)

This invention relates to special arrangements of sealed storage batteries and of charging circuits therefor wherein the batteries are provided with control switches operable by the internal cell pressures in the battery. It is to be noted that the "battery" is herein used to include one or more individual cells.

An object of the invention is to provide an economical and simple combination of battery control switch and charging circuit.

Hermetically sealed cells undergo a marked increase in internal pressure as the cells are charged to a fully charged state. Also such increase in internal pressure may occur if the cells are overdischarged. The rise in internal pressure at the end of the charging of a cell is herein utilized to operate a pressure switch to terminate the charging operation.

In prior charging circuits for sealed storage cells such, for example, as are described in the pending application Serial No. 781,160 of George W. Anderson and Sol S. Jaffe filed December 17, 1958, now U.S. Patent No. 3,058,046, the charging circuit is provided with a relay and holding circuit for each cell the function of which is to prevent the charging operation from being resumed once a cell has reached a charged state and the cell pressure later subsides. By preventing the charging operation from being so resumed, it is assured that cells which have been left on the charging rack for a sufficient time to enable the cells to be charged and the internal pressure then to subside, will be ready for use when they are taken from the charging rack.

In the present invention the need for a charging relay and holding circuit as above explained is eliminated by the simple expedient of using a pressure switch of the latch type on each cell. For example, with such latch type of pressure switch each cell can be connected directly to the charging circuit through the pressure switch and when the cell is charged as indicated by the operation of the pressure switch the charging operation is terminated and cannot be resumed because of the pressure switch having become latched in its operated position. A reset button is provided on each battery to enable the pressure switch to be released after the internal pressure has subsided so that the battery can be used.

In carrying out the invention with batteries connected in series in the charging circuit, each pressure switch or switches of the respective battery is so connected with a load device in the battery that when one of the pressure switches is operated it will connect the load device across the battery terminals in place of the battery cells and maintain a stabilized load condition on the charging circuit. Such load device is however not necessary when batteries are charged in parallel.

In accordance with a further feature of the invention each battery may have a signalling device—preferably a signal lamp—controlled by the pressure switches and serving as an aid to prevent inadvertent connecting of a battery to the charging circuit while the internal pressure is still so high in one or more of the cells that the pressure switches cannot be released to their normal positions.

Figure 2:
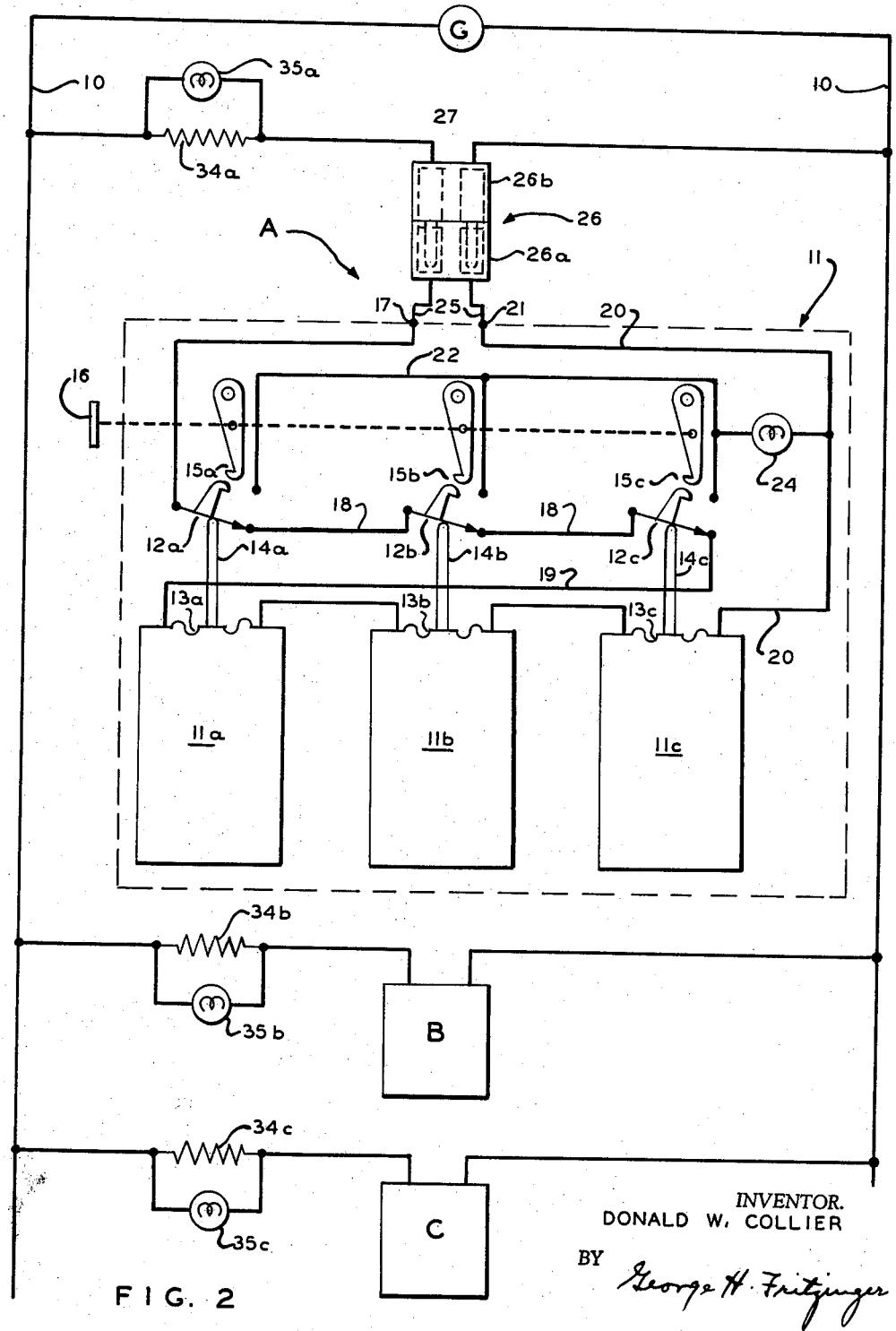

In the description of the invention reference is had to the accompanying drawings, of which:

FIGURE 1 is a schematic circuit diagram illustrating the invention in connection with the charging of batteries in series; and FIGURE 2 is a schematic circuit diagram illustrating the invention in connection with a charging circuit wherein the batteries are connected in parallel.

In FIGURE 1 there is a generator connected to a charging circuit 10 including a series of charging stations A, B, C, D, etc., of which the station C is shown in detail and the others are only diagrammatically represented, it being understood that each station is adapted for charging a single battery 11 comprising one or more individual cells. By way of illustrative example the battery 11 is herein shown as comprising three cells 11a, 11b and 11c connected in series. These are hermetically sealed cells typically of the nickel cadmium alkaline type such as are disclosed in the pending Grieger application Serial No. 563,753, filed February 6, 1956, now U.S. Patent No. 3,022,363. These cells have positive electrodes provided with an initial charge content greater than that of the negative electrodes and having also a lesser remaining charge capability than the negative electrodes, with the result that the positive electrodes are the first to be charged and will evolve oxygen gas on overcharge and the negative electrodes are the first to be discharged and will evolve oxygen gas on overdischarge. The evolved oxygen gas later recombines with exposed portions of the negative electrodes to return the internal gaseous pressure to normal. The cells of the battery 11 are provided with individual pressure switches 12a, 12b and 12c which normally stand in the positions shown in the drawing. When an abnormally high internal pressure develops in any one of the cells such as will occur at the end of a charging operation, the respective pressure switch is operated to its other position. The operating means for the respective pressure switches comprises diaphragms 13a, 13b and 13c on the respective cells having respective push rods 14a, 14b and 14c for shifting the poles of the respective switches. A feature of the present invention is in using pressure switches of a type which become latched when shifted to their operated positions. The latch means may comprise catch members on the respective poles and cooperating pivoted latch pawls 15a, 15b and 15c. Thus, upon any one of the pressure switches being shifted to its operated position the associated pawl will engage the respective catch member and hold the switch in its operated position. A reset button 16 is provided in coupled relation to each of the pawls so that when the button is pressed the pawls are released to allow return of the pressure switch to normal position should the internal pressure of the respective cell have fallen within its normal range.

The pressure switches of each battery are serially connected with the cells by connecting one terminal 17 of the battery to the pole of switch 12a, running jumpers 18 from the normally closed contacts of switches 12a and 12b to the poles of the next succeeding switches, and running a jumper 19 from the normally closed contact of switch 12c to one terminal of the first cell 11a. The cells are serially connected, and the last terminal of the cell 11c is connected by a jumper 20 to the other terminal 21 of the battery. Each of the normally open contacts of the pressure switches are connected by a lead wire 22 through a load resistor 23 to the battery terminal 21, this load circuit being chosen to simulate the load impedance of the battery in the charging circuit when any one of the pressure switches is operated. Preferably, the load circuit includes also a signalling device such, for example, as a signal lamp 24 in parallel with the load resistor 23 and normally of a type having a substantially higher resistance than that of the load resistor.

Each battery is connectable serially in the charging circuit through lead wires 25, a plug type connector 26, lead wires 27 and an on-off switch 28. The connector comprises separable parts 26a and 26b provided respectively with jack and pin elements of which the former part may typically be mounted on the headpiece of a mine lamp as when the battery is part of a mine lamp equipment, and the latter is mounted on a charging rack 29 including the generator G and charging circuit 10. By means not herein necessary to show in detail the engagement of the connector parts is adapted through a suitable mechanical connection 30 to shift the on-off switch 28 to its "on" position shown in the drawing. When the battery is disconnected from the charging circuit this on-off switch goes back to its "off" position to connect a respective load resistor 31 in the charging circuit in place of the battery which has just been removed whereby not only to maintain continuity of the charging circuit but also a stable load condition on the generator.

When a battery has been connected to the charging circuit the attendant is to note first if the lamp 24 is out. If the lamp is lit he presses the reset button 16 to unlatch the pressure switches for return to their normal positions. Should the lamp 24 light again upon release of the reset button, it means that the internal pressure in one or more of the cells of the battery is at an abnormally high value as from an overdischarging of the cells and that the battery is not yet able to take a charge. The lamp serves therefore as a signalling means to prevent inadvertent connecting of the battery to the charging rack before it is able to be charged.

When charging has proceeded to where one of the cells has received a full charge indicated by a rise in the internal pressure of the cell to a point where the respective pressure switch is operated, the load resistor 23 is connected in the charging circuit in place of the battery, maintaining continuity of the charging circuit, and the lamp 24 is again lit. The battery is left normally on the charging rack for a sufficient time to allow it to receive a full charge and the internal pressure of the cells to subside to where the operated pressure switch would return to normal position when the latch is released. As a check on whether the internal pressure has so subsided, the attendant may momentarily press the reset button 16 and note if the lamp 24 goes out before he removes the battery from the charging rack.

If a faulty connection should occur in any one of the connectors 26 effectively producing an "open" in the charging circuit, a relay 32 in the charging circuit at the generator drops out causing its switch 32a to connect a buzzer 33 across the generator. The warning signal so given will thus apprise the attendant as to the faulty circuit connection.

In the charging circuit shown in FIGURE 2 the respective charging stations A, B, C, etc., are connected in parallel with the generator G preferably through respective resistors 34a, 34b, 34c, etc., to stabilize the charging current with change in the charge state of the respective batteries. Paralleling the stabilizing resistors are respective signal lamps 35a, 35b, 35c, etc. Connections of the respective batteries to the charging circuit are made through the connectors 26, as before, but the on-off switches 28 and load resistors 31 of the prior embodiment are now eliminated because continuity of the respective parallel branches when the batteries are disconnected from the charging circuit is no longer necessary. Each battery 11 may have the same pressure switch arrangement and connections as in the prior embodiment except that the load resistor 23 is preferably now eliminated since preservation of a load circuit in the battery when one of the pressure switches is operated is no longer necessary. However, the signal lamp 24 is preferably retained to perform its signalling functions hereinbefore described. Also, as before, this signal lamp is provided with an internal resistance which is substantially higher than the equivalent load resistance of the battery in the charging circuit.

When the attendant plugs a battery into the charging circuit he will check first if the respective signal lamp 35 is lit to indicate that a good circuit connection has been made through the connector 26. Next the attendant will check if the battery lamp 24 is lit and, if so, he will press the reset button 16 momentarily to unlatch the pressure switches. If the lamp 24 goes out responsive to the momentary pressing of the reset button he will know that the internal cell pressures have subsided to render the battery ready for charging. When the battery becomes charged one of the cell pressure switches will be operated into its latched position causing the signal lamp 24 to become again lit and the signal lamp 35 to go out because of the signal lamp 24 having a much higher internal resistance than the respective resistor 34. Before a charged battery is taken from the charging rack the attendant may check if the internal pressure has subsided by pressing the reset button momentarily and noting if the battery lamp 24 goes out.

In each of the foregoing charging circuits illustrating the invention, the latch type pressure switch associated with each cell of the battery provides a relatively simple and economical means for assuring that once a battery has become charged, as evidenced by a pressure switch of the battery becoming operated, the charging of the battery will not again be resumed when the internal cell pressure subsides notwithstanding that the battery is still left on the charging rack.

The embodiments of my invention herein particularly described are intended to be illustrative and not limitative of my invention, since the same are subject to changes and modifications without departure from the scope of my invention, which I endeavor to express according to the following claims.

I claim:

1. In combination: a plurality of sealed storage batteries each having a pressure switch of the single-pole double-throw type operable from a first normal position to a second abnormal position by internal cell pressure when the internal pressure rises to an above normal value indicating that the battery during charge has reached a fully charged condition; a charging circuit; means for connecting said batteries in series with said charging circuit through the respective pressure switches only when the respective switches are in their said first position; a load circuit in each battery for simulating the load impedance of the battery in the charging circuit when the battery is disconnected therefrom; circuit connections in each battery for disconnecting the battery from its terminals and connecting said load circuit across the terminals when the respective pressure switch is operated to its said second position; a latch for holding the pressure switch in said second position; and a manual reset control on each battery for releasing the respective pressure switch.

2. The combination set forth in claim 1 wherein said load circuit includes a signalling means.

3. A storage battery including a plurality of separate hermetically sealed cells of the type which evolves a gas when overcharged and overdischarged; a pressure switch mounted on each of said cells and operable by internal cell pressure from a normal position when the internal pressure rises to an above normal value; a latch associated with each of said pressure switches for latching the switch when the same is operated from normal position; a pair of terminals for said battery connected to said cells through said pressure switches only when the switches are in said normal position; and a single reset control on said battery operatively coupled to each of said latches for releasing the latches when the reset control is operated.

4. The storage battery arrangement set forth in claim 3 wherein each of said pressure switches is of a single-pole double-throw type including circuit means for providing an alternate circuit across said battery terminals when any one of said pressure switches is operated; and signalling means connected in said alternate circuit.

5. A storage battery including a plurality of separate hermetically sealed cells of the type which evolves a gas when overcharged and overdischarged; a pressure switch of the single-pole double-throw type mounted on each of said cells and operated by internal cell pressure from a first normal position to a second abnormal position when the internal cell pressure rises to an above normal value; a pair of terminals on said battery; a first circuit means connecting one of said terminals to the pole member of a first one of said pressure switches and connecting the normally made contact of said first pressure switch to the pole member of a second of said pressure switches, etc., to the last of said pressure switches; a second circuit means connecting said cells in series between the normally made contact of the last of said pressure switches and the second of said terminals; and impedance means connected between said second terminal and each of the normally open contacts of said pressure switches.

6. In combination: a plurality of sealed storage batteries each having a pressure switch operable from a normally closed position by internal cell pressure when the internal pressure rises to an above normal value indicating that the battery during charge has reached a fully charged condition; a charging circuit; means for connecting said batteries through said respective pressure switches to said charging circuit in parallel; a latch means on each of said batteries for the respective pressure switch; a manual reset control on each battery for said latch means; and a signalling device for each of said batteries and circuit means for causing the pressure switch to disconnect the battery from and to connect the signalling device across the battery terminals when the pressure switch is operated, said signalling device having a load impedance substantially greater than that of the battery in said charging circuit.

References Cited in the file of this patent

UNITED STATES PATENTS

| | | |
|---|---|---|
| 1,034,108 | Helblieb | July 30, 1912 |
| 1,389,871 | Hersh | Sept. 6, 1921 |
| 2,004,767 | Prince | June 11, 1935 |
| 2,104,632 | Agnew | Jan. 4, 1938 |
| 2,624,033 | Jacquier | Dec. 30, 1952 |
| 3,003,100 | Euwema | Oct. 3, 1961 |

FOREIGN PATENTS

| | | |
|---|---|---|
| 728,870 | Great Britain | Apr. 27, 1955 |